(12) United States Patent
Ge et al.

(10) Patent No.: US 12,367,087 B2
(45) Date of Patent: Jul. 22, 2025

(54) AUTO-CALIBRATION OF ERROR DETECTION SIGNALS

(71) Applicant: Micron Technology, Inc., Boise, ID (US)

(72) Inventors: Hao Ge, Fremont, CA (US); Jaeil Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 75 days.

(21) Appl. No.: 17/899,298

(22) Filed: Aug. 30, 2022

(65) Prior Publication Data

US 2024/0070001 A1 Feb. 29, 2024

(51) Int. Cl.
G06F 11/00 (2006.01)
G06F 11/07 (2006.01)
H04L 1/00 (2006.01)

(52) U.S. Cl.
CPC ........ G06F 11/0751 (2013.01); G06F 11/073 (2013.01); H04L 1/0061 (2013.01)

(58) Field of Classification Search
None
See application file for complete search history.

(56) References Cited

U.S. PATENT DOCUMENTS

| | | | |
|---|---|---|---|
| 10,446,241 B1* | 10/2019 | Liikanen | G11C 16/26 |
| 2011/0161747 A1* | 6/2011 | Yamazaki | G06F 11/2215 |
| | | | 714/E11.002 |
| 2020/0201705 A1* | 6/2020 | Kim | G06F 11/0793 |
| 2020/0285532 A1* | 9/2020 | Choi | G06F 11/0751 |
| 2022/0091186 A1* | 3/2022 | Durga | G06F 1/10 |
| 2022/0138066 A1* | 5/2022 | Gaur | G11C 29/02 |
| | | | 714/703 |
| 2023/0386584 A1* | 11/2023 | Ramachandra | G11C 16/10 |

OTHER PUBLICATIONS

Google Scholar/Patents search—text refined (Year: 2024).*
Google Scholar/Patents search—text refined (Year: 2025).*

* cited by examiner

*Primary Examiner* — Christopher S McCarthy
(74) *Attorney, Agent, or Firm* — Holland & Hart LLP

(57) ABSTRACT

Methods, systems, and devices for auto-calibration of error detection signals are described. An error may be injected into a data signal obtained from a memory array. After injecting the error into the data signal, the data signal may be applied to an error detection circuit of the memory array, where the error detection circuit may output an error signal for the data signal. The error signal may be delayed relative to a control signal by a first amount. A timing signal that controls the propagation of the error signal may be obtained based on delaying the control signal by a second amount. Based on a comparison of the error signal and the timing signal, a third amount for delaying the control signal may be determined.

25 Claims, 9 Drawing Sheets

AUTO-CALIBRATION OF ERROR DETECTION SIGNALS

FIELD OF TECHNOLOGY

The following relates to one or more systems for memory, including auto-calibration of error detection signals.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
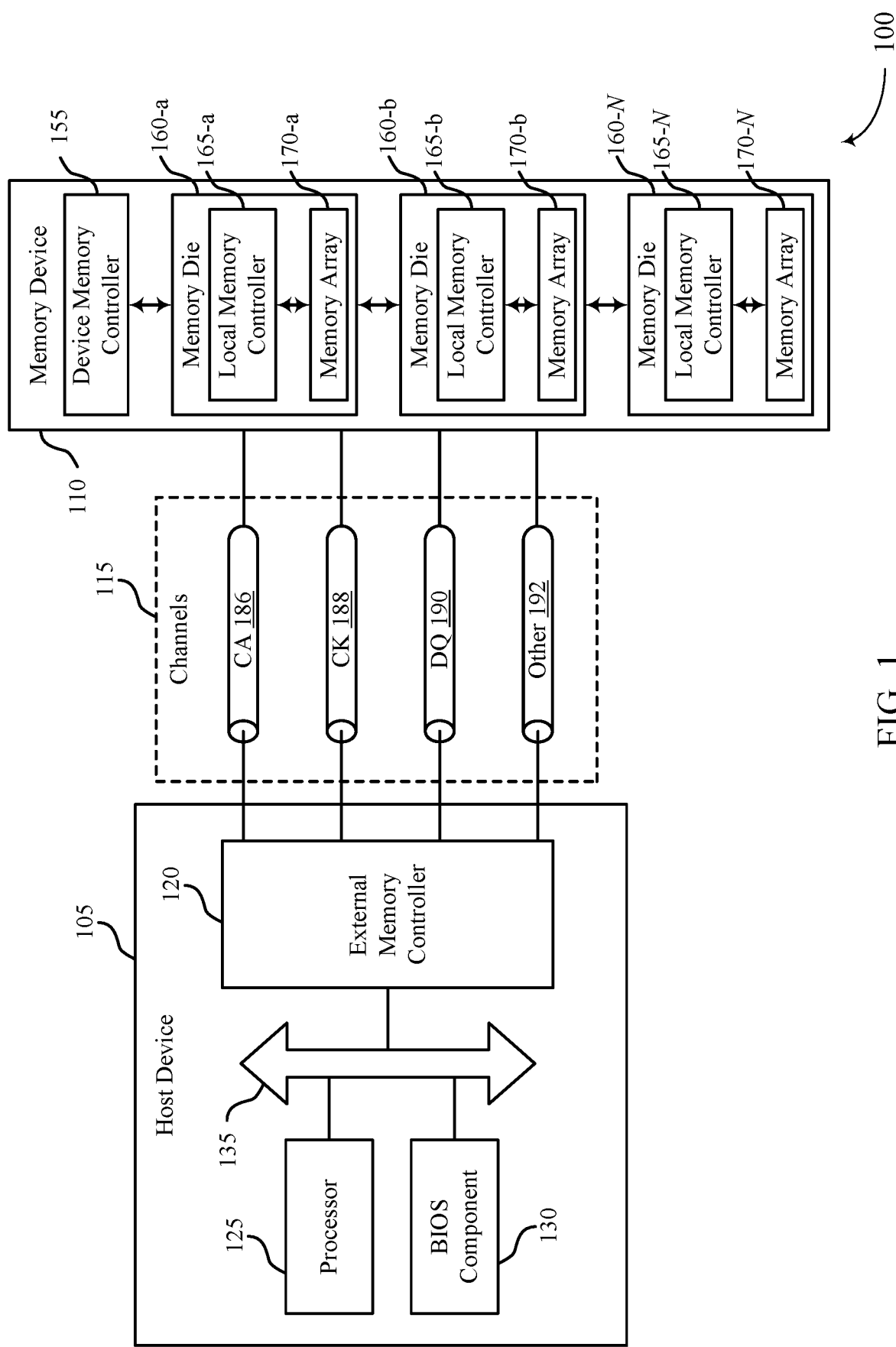
FIG. 1 shows an example of a system that supports auto-calibration of error detection signals in accordance with examples as disclosed herein.

A memory device may be configured to detect and, in some examples, correct errors in data stored in a memory array of the memory device—using an error detection component. To support detecting errors in the memory device, a data signal obtained from reading data from the memory array may be inputted into an error detection component. The error detection component may analyze the data signal and output an error vector that indicates whether the data signal includes any errors (and in some examples a location of the errors in a codeword represented by the data signal). In some examples, a duration may elapse between the error vector receiving the data signal and outputting the error signal (which may be referred to as an error correction code (ECC) delay). If one or more errors are detected in the data signal, the error vector may be used to correct the one or more errors in the data signal—e.g., by inverting one or more bits of the codeword identified as including the one or more errors.

To ensure that the correct error vector is applied to the correct data signal (e.g., the data signal for which the error vector is generated), the memory device may generate a timing signal that controls a propagation of the error vector relative to the propagation of the data signal through the memory device. In some examples, the timing signal is timed off of a read signal that is used to trigger the generation of the read signal. For example, the timing signal may be delayed relative to the read signal by a fixed amount that is determined based on an ECC delay that measured or predicted for the error detection circuit.

However, using a fixed delay to generate the timing signal may cause error vectors to be combined with the incorrect data signals. For examples, changes in the ECC delay during operation or across different memory devices, changes in the operation of the memory device, or both, may cause an error vector to be combined with an incorrect data signal—e.g., a data signal that was not used to obtain the error vector. Thus, the error vector may introduce an error into the incorrect data signal and fail to correct an error in the data signal used to obtain the error vector.

To improve an alignment of error vectors and data signals, techniques for autonomously aligning the error vectors and data signals are described herein. The techniques may include circuits for autonomously aligning the error vectors and data signals. The techniques may employ a calibration circuit for autonomously calibrating a variable delay element that is configured to generate a timing signal that controls the propagation of the error vector such that it is properly aligned with the error vector. As part of the calibration, the calibration circuit may be configured to control the generation of the error vector signal by injecting an error into a data signal from which the error vector signal is obtained. The calibration circuit may calibrate the delay of the variable delay element based on comparing a timing of an error vector signal with a timing of the timing signal. In some examples, the calibration circuit may compare the timing of the error vector signal with a timing of the timing signal multiple times during a calibration period, where each instance of the timing signal may have varying levels of delay.

FIG. 1 shows an example of a system 100 that supports auto-calibration of error detection signals in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The memory device 110 may be capable of detecting and, in some examples, correcting errors in data read from a memory array. To support error detection and correction, the memory device 110 may generate, for a set of data bits to be stored in the memory array, a set of parity bits and may store the set of parity bits with the set of data in the memory array. Together, the set of data bits and the set of parity bits may be referred to as a codeword. In some examples, the memory device 110 may include an error correction code engine that is configured to receive a codeword and determine whether there are one or more errors in the data bits of the codeword. To determine whether there are one or more errors in the data bits, the memory device 110 may apply the data bits and parity bits to a a combinatorial logic circuit (e.g., OR gates, AND gates, XOR gates) to generate a set of syndrome bits. The syndrome bits may indicate whether there is an error in the data bits and, in some examples, a bit position of the error in the data bits. To correct the error, a control signal (which may be referred to as an "error vector" or "error signal") may be generated (e.g., by the error correction code engine) for inverting the bit at the identified bit position. In some examples, there is a delay (which may be referred to as "ECC delay") between a time when the error correction code receives a codeword and a time when the error correction code engine outputs a signal for inverting an erroneous data bit in the codeword.

The memory device 110 may be configured to align the error vector with the set of data used to generate the error vector—e.g., so that the signal for inverting the data bit is applied to the correct set of data and not an earlier or subsequent set of data. That is, the memory device 110 may generate a control signal (which may be referred to as a "timing signal") for propagating the error vector for combination with the set of data that was obtained from the memory array and used to generate the error vector. In some examples, the timing signal may be generated relative to a control signal (which may be referred to as a "read signal") that triggers the reading of the set of data from the memory array. For example, the timing signal may be obtained by generating a version of the read signal that is delayed by a particular amount, where the amount of delay may be based on a measured or predicted amount of delay for the error correction code to generate an error vector from a data signal.

However, using a fixed delay to generate the timing signal may cause error vectors to be combined with the incorrect data signals. For examples, changes in the ECC delay during operation (e.g., caused by temperature variations, VDD variations, etc.) or across different memory devices, changes in the operation of the memory device 110 (e.g., changes to the clock frequency configuration), or both, may cause an error vector to be combined with an incorrect data signal—e.g., a data signal that was not used to obtain the error vector. Thus, the error vector may introduce an error into the incorrect data signal and fail to correct an error in the data signal used to obtain the error vector.

To improve an alignment of error vectors and data signals, techniques for autonomously aligning the error vectors and data signals are described herein. The techniques may include circuits for autonomously aligning the error vectors and data signals. The techniques may employ a calibration circuit for autonomously calibrating a variable delay element that is configured to generate a timing signal that controls the propagation of the error vector such that it is properly aligned with the error vector. As part of the calibration, the calibration circuit may be configured to control the generation of the error vector signal by injecting an error into a data signal from which the error vector signal is obtained. The calibration circuit may calibrate the delay of the variable delay element based on comparing a timing of an error vector signal with a timing of the timing signal. In some examples, the calibration circuit may compare the timing of the error vector signal with a timing of the timing signal multiple times during a calibration period, where each instance of the timing signal may have varying levels of delay.

In some examples for preventing the misalignment of error vectors and data signals, during a calibration procedure (triggered by startup, operating parameter changes, etc.), the memory device 110 obtains a data signal with an error. For example, the memory device 110 may generate the data signal with the error or inject an error into a data signal obtained (e.g., read) from a memory array 170. In some examples, the memory device 110 obtains the data signal from the memory array based on generating a read signal (e.g., a read data strobe signal). The memory device 110 may apply the data signal with the error to an error correction code engine, which may generate an error signal based on the data signal. The error correction code engine may generate the error signal after a duration has elapsed since receiving the data signal and a second duration has elapsed since the read signal was generated. That is, the error correction code engine may generate the error signal with a first amount of delay relative to the read signal being generated.

Concurrently with obtaining the data signal, the memory device 110 may generate a timing signal based on generating the read signal, where the timing signal may control a propagation of the error signal. The timing signal may be generated after a third duration has elapsed since the read signal was generated. That is, the memory device 110 may generate the timing signal with a second amount of delay relative to the read signal being generated. The memory device 110 may compare the generation of the timing signal with the generation of the error signal. The memory device 110 may further determine a third amount of delay to apply to the read signal for obtaining the timing signal based on the comparison of the timing signal and the error signal. In some examples, the memory device 110 may compare the multiple instances of the timing signal (with varying levels of delay) with multiple instances of the error signal during a calibration period to determine the third amount of delay.

By autonomously aligning the timing signal and the error signal generated by the error correction code engine, misalignment of error signal and data signals may be reduced (e.g., prevented). Accordingly, a bit error rate of the memory device 110 may be reduced.

Although the memory device 110 is described as using DRAM technology, the techniques described herein may be applied to any memory device technology that uses error correction.

Figure 2:
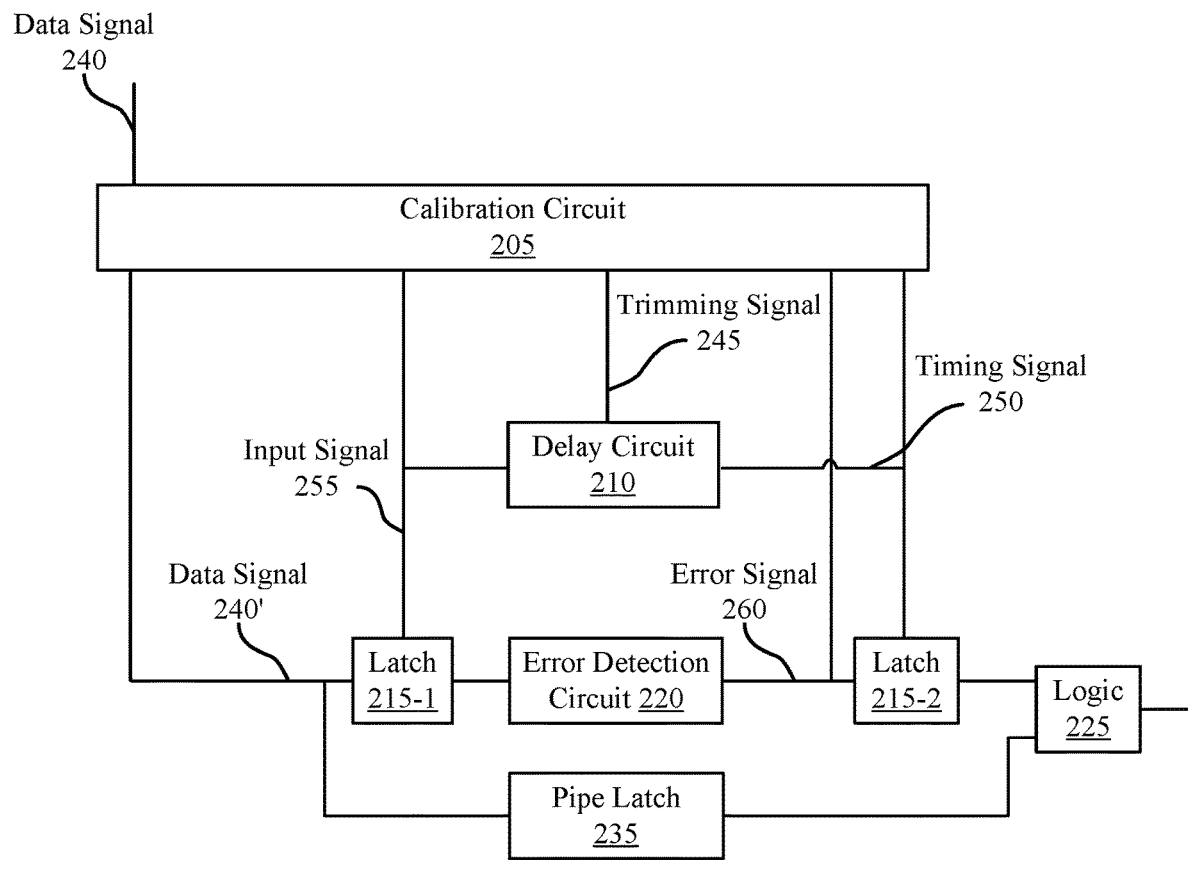
FIG. 2 shows an example of a subsystem that supports auto-calibration of error detection signals in accordance with examples as disclosed herein.

FIG. 2 shows an example of a subsystem 200 that supports auto-calibration of error detection signals in accordance with examples as disclosed herein. The subsystem 200 may include a calibration circuit 205, a delay circuit 210, a first latch 215-1, a second latch 215-2, a error detection circuit 220, a logic 225, and a pipe latch 235. The subsystem 200 may process and generate one or more data and control signals, including a data signal 240, a trimming signal 245, a timing signal 250, an input signal 255, and an error signal 260.

The calibration circuit 205 may be configured to inject (e.g., while the subsystem 200 is in a calibration mode) an error into the data signal 240 to obtain a modified version of the data signal 240 (which may be represented as the data signal 240'). In some examples, the calibration circuit 205 may multiplex the data signal 240' from a known codeword with an error (may inject each bit of data signal 240'). In some examples, the calibration circuit 205 may be configured to inject the error at a particular bit position of the codeword represented by the data signal 240. In some examples, an error correction code engine may generate an error signal for a codeword having an error at the particular bit position with a first amount of delay. Additionally, a worst-case delay for the error correction code engine to generate an error signal may be determined relative to the first amount of delay. The calibration circuit 205 may also be configured to output the input signal 255 to other components of the subsystem 200. The input signal 255 may be a read signal (e.g., a read data strobe signal) used to obtain the data signal 240 from the memory array.

The calibration circuit 205 may also be configured to compare the timing signal 250 and the error signal 260— e.g., to determine whether a voltage of the timing signal 250 is high at a same time that a voltage of the error signal 260 is high. In some examples, the calibration circuit 205 may be configured to compare multiple instances of the timing signal 250 with multiple instances of the error signal 260 during a calibration period. The calibration circuit 205 may also be configured to generate the trimming signal 245 based on a result of the one or more comparisons of the error signal 260 and the timing signal 250, where a value of the trimming signal 245 may control an amount of delay introduced by the delay circuit 210.

The delay circuit 210 may be configured to generate the timing signal 250 based on the input signal 255, where the timing signal 250 may be delayed relative to the input signal 255 based on an amount of delay configured for the delay circuit 210. In some examples, an amount of delay introduced by the delay circuit 210 may be configured based on a value of the trimming signal 245. In some examples, the delay circuit 210 may receive the input signal 255 and generate a delayed version of the input signal 255, where the delayed version of the input signal 255 may be equivalent to the timing signal 250. Accordingly, the timing signal 250 may be delayed relative to the input signal 255 based on an amount of delay for which the delay circuit 210 is configured.

The first latch 215-1 may be configured to hold and output the modified version of the data signal 240' to the error detection circuit 220 when the input signal 255 is generated—e.g., when the input signal 255 transitions from a first voltage level to a second voltage level. The pipe latch 235 may be configured to hold and output the modified version of the data signal 240' to the logic 225 (which may include XOR gates).

The error detection circuit 220 may be configured to detect an error in the modified version of the data signal 240' and to output the error signal 260. The error signal 260 may be configured to invert the erroneous bit of the modified version of the data signal 240' when combined with the modified version of the data signal 240'. The error signal 260 may be delayed relative to the input signal 255 based on an amount of delay associated with the operation of the error detection circuit 220.

The second latch 215-2 may be configured to hold and output the error signal 260 to the logic 225 when the timing signal 250 is generated—e.g., when the timing signal 250 transitions from a first voltage level to a second voltage level. The logic 225 may be configured to combine the error signal 260 with the modified version of the data signal 240', where the erroneous bit in the modified version of the data signal 240' may be inverted based on the combining.

Figure 3:
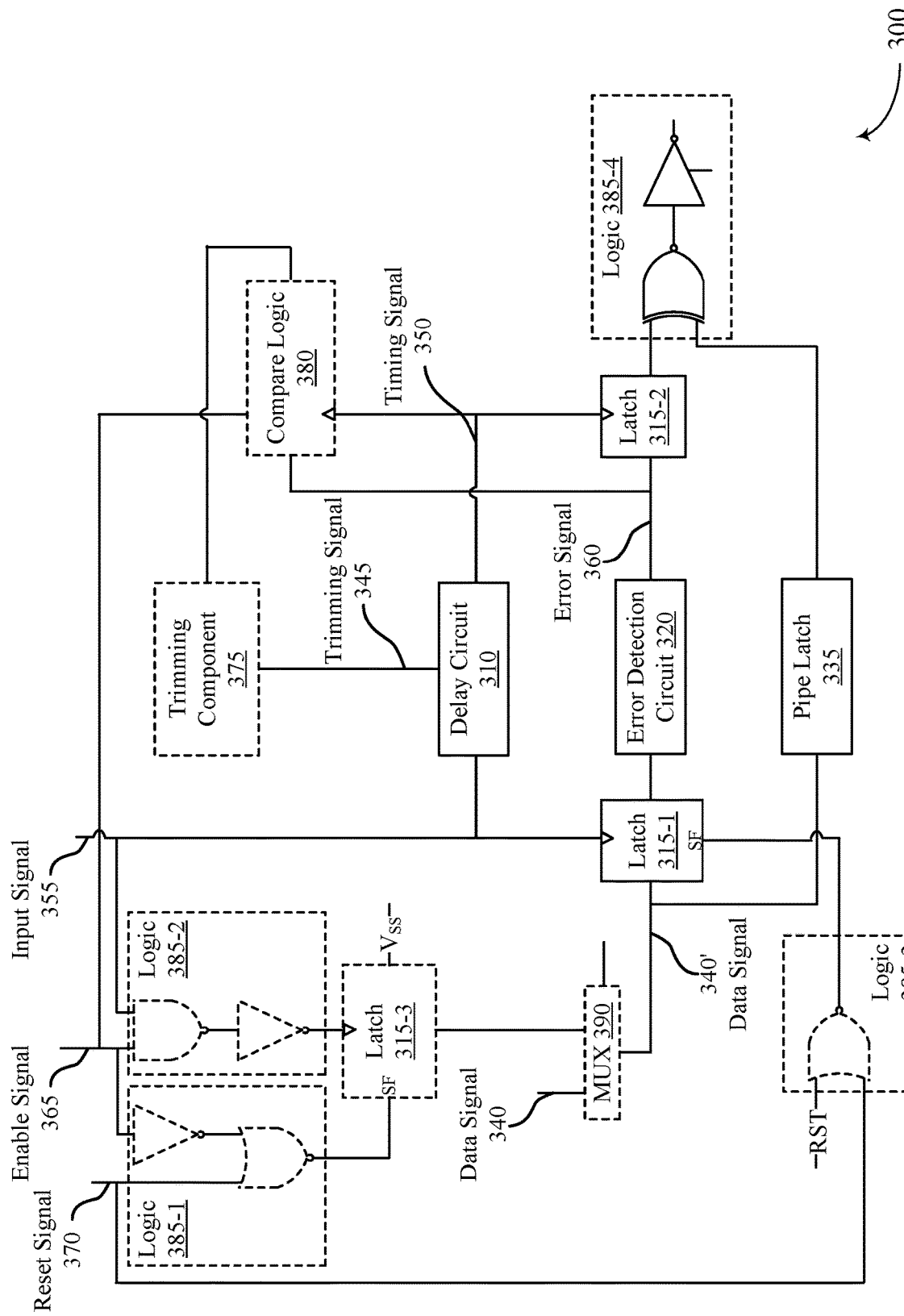
FIG. 3 shows an example of a subsystem that supports auto-calibration of error detection signals in accordance with examples as disclosed herein.

FIG. 3 shows an example of a subsystem 300 that supports auto-calibration of error detection signals in accordance with examples as disclosed herein.

The subsystem 300 may be an example of the subsystem 200 of FIG. 2. With reference to FIG. 2, the subsystem 300 may show circuit elements of the calibration circuit 205, which may be depicted using dashed lines.

The subsystem 300 may include a delay circuit 310, a first latch 315-1, a second latch 315-2, a error detection circuit 320, and a pipe latch 335, which may be examples of the delay circuit 210, the first latch 215-1, the second latch 215-2, the error detection circuit 220, and the pipe latch 235 described with reference to FIG. 2. The subsystem 300 may also include a third latches 315-3, a trimming component 375, compare logic 380, first logic 385-1, second logic 385-2, third logic 385-3, fourth logic 385-4, and a multiplexer 390.

The subsystem 300 may also process and generate one or more data and control signals, including data signal 340, trimming signal 345, timing signal 350, input signal 355, and error signal 360, which may be examples of the data signal 240, the trimming signal 245, the timing signal 250, the input signal 255, and the error signal 260 described with reference to FIG. 2. The subsystem 300 may also process and generate the enable signal 365 and the reset signal 370.

While in an operating mode, the subsystem 300 may process data obtained from a memory array. For example, the subsystem 300 may obtain a data signal based on sensing a codeword stored in a memory array. After obtaining the data signal, the subsystem 300 may temporarily store the data signal at pipe latch 335 and may concurrently input the data signal into the error detection circuit 320. The error detection circuit 320 may analyze the data signal for errors. Based on analyzing the data signal, the error detection circuit 320 may output an error vector. If the error detection circuit 320 detects an error in the data signal, the error vector may indicate a location of the error in the data signal (e.g., by setting one or more components of the error vector to a high voltage). Otherwise, the error vector may indicate no errors in the data signal (e.g., by maintaining each component of the error vector at a low voltage).

The error detection circuit 320 may also be configured to correct identified errors in the data signal—e.g., by combining the error vector with the stored data signal. To ensure that the error vector is combined with the data signal, a timing signal that controls the combination of the error vector and the data signal may be generated (e.g., by the delay circuit 210). The timing signal may be generated relative to a read signal that triggered the obtaining of the data signal—e.g., so that a common reference can be used for the data signal and the timing signal.

In a calibration mode, the third latches 315-3 may be configured to hold and output a signal used to inject an error into the data signal 340. The third latches 315-3 may output a known signal (e.g., that has combination of a voltage of the low supply rail (Vss) or a voltage of the high supply rail (Vcc)) to the multiplexer 390, where the multiplexer 390 may inject the signal into to the data signal 340. In some examples, the multiplexer 390 may replace a signal component of the data signal 340 (corresponding to each bit of a codeword represented by the data signal, or one bit of the codeword) with the signal received from the third latches 315-3 and output a version of the data signal 340 that includes an error (which may be represented as the data signal 340').

The compare logic 380 may be configured to compare the timing signal 350 and the error signal 360. In some examples, the compare logic 380 may be a D flip-flop or a latch. The compare logic 380 may be configured to hold and output the voltage of the error signal 360 when the timing signal 350 transitions from a first voltage to a second voltage. In some examples, the compare logic 380 may be configured to compare multiple instances of the timing signal 350 and the error signal 360 during a calibration period.

The trimming component 375 may be configured to generate a trimming code based on the comparison of the timing signal 350 and the error signal 360. In some examples, the trimming code is a multi-bit code. The trimming component 375 may be further configured to generate the trimming signal 345 based on a value of the generated trimming code. When multiple instances of the timing signal 350 and the error signal 360 are compared during a calibration period, the trimming component 375 may be configured to configure a respective bit of the trimming code each time the timing signal 350 and the error signal 360 are compared. Additionally, during each comparison, an updated trimming code may be generated by the trimming component 375 and applied to the delay circuit 310—e.g., such that an updated timing signal is used for each comparison. The subsystem 300 may include a counter or sequential flip flops that are used to determine when a threshold quantity of comparisons have been performed (e.g., relative to a power up signal) and to generate a signal for terminating a calibration mode when the threshold quantity of comparisons is reached.

The first logic 385-1 may be configured to reset the operation of the calibration circuit—e.g., after each cycle of the calibration procedure. The first logic 385-1 may include an inverter that is configured to receive the enable signal 365 (which may be used to enable the calibration procedure). The first logic 385-1 may also include a NOR gate configured to output a signal for resetting the third latch 315-3. The second logic 385-2 may be configured to generate a signal for causing the third latches 315-3 to hold and output the voltages of a data signal that includes an error and that is to be injected into the data path of the subsystem 300. The second logic 385-2 may include a NAND gate to combine the enable signal 365 and the input signal 355, and an inverter to invert an output of the NAND gate. Thus, the second logic 385-2 may generate a signal that activates the operation of the third latches 315-3 when the calibration procedure is enabled and the input signal 355 is generated (e.g., when the read data strobe signal is activated).

The third logic 385-3 may be configured to reset the operation of the calibration circuit—e.g., in combination with the first logic 385-1. The third logic 385-3 may include a NOR gate configured to output a signal for resetting the first latch 315-1. The fourth logic 385-4 may be configured to combine the error signal 360 with the modified version of the data signal 340' and to output the resulting data signal to a global data bus. The fourth logic 385-4 may include an exclusive NOR gate configured to combine the error signal 360 with the modified version of the data signal 340'. The fourth logic 385-4 may also include an inverter configured to invert the output of the NOR gate and output a global data signal (e.g., a data signal provided to a host device) when a timing signal is received.

Figure 4:
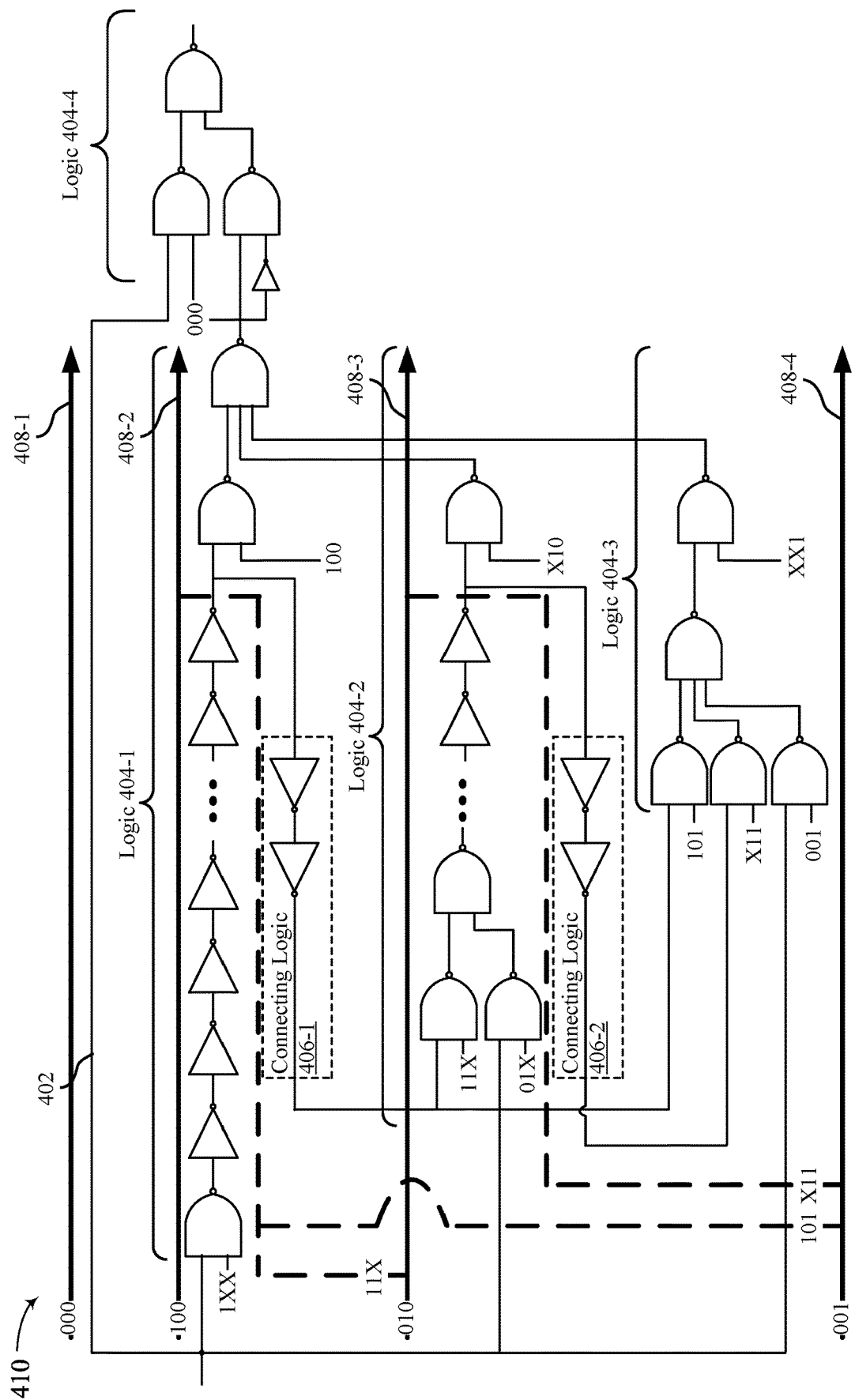
FIG. 4 shows an example of a delay circuit that supports auto-calibration of error detection signals in accordance with examples as disclosed herein.

FIG. 4 shows an example of a delay circuit 410 that supports auto-calibration of error detection signals in accordance with examples as disclosed herein.

The delay circuit 410 is configurable to introduce different amounts of delay into a signal path through the delay circuit

410. The signal path through the delay circuit 410 may be based on a value of a trimming code provided to the delay circuit 410, where signal paths through the delay circuit 410 for particular trimming codes are depicted in FIG. 4 using thicker lines and labeled accordingly. The delay circuit 410 may be an example of a delay circuit described with reference to FIG. 2 or 3.

The delay circuit 410 may include a first signal path 408-1 that includes the direct path 402, a second signal path 408-2 that includes the first logic 404-1, third signal paths (including a third signal path 408-3) that include the second logic 404-2, and fourth signal paths (including a fourth signal path 408-4) that include the third logic 404-3. The signal path associated with the first logic 404-1 may include sixteen logic gates. The signal paths associated with the second logic 404-2 may each include eight logic gates. And the signal paths associated with the third logic 404-3 may each include four logic gates. The final logic gate of each of the first logic 404-1, the second logic 404-2, and the third logic 404-3 may be shared by the first logic 404-1, the second logic 404-2, and the third logic 404-3.

Accordingly, a signal that propagates through the first logic 404-1 may experience an amount of delay that is based on travelling through sixteen logic gates. A signal that propagates through the second logic 404-2 may experience an amount of delay that is based on travelling through eight logic gates. A signal that propagates through the third logic 404-3 may experience an amount of delay that is based on travelling through four logic gates. And a signal that propagates through the direct path 402 may experience an amount of delay that is based on travelling through no logic gates. Each of the signal paths may terminate with the fourth logic 404-4, where the signal paths associated with the fourth logic 404-4 may each include two logic gates.

As described herein, the amount of delay introduced by the delay circuit 410 may be based on a value of a trimming code. For example, if the trimming code is 000, a signal applied to the delay circuit 410 may travel through the direct path 402 (which may correspond to the first signal path 408-1) with zero logic gates of delay prior to reaching the fourth logic 404-4. If the trimming code is 001, a signal applied to the delay circuit 410 may travel through the fourth signal path 408-4 of the third logic 404-3 (beginning with the lowest logic gate) and may experience four logic gates of delay prior to reaching the fourth logic 404-4. If the trimming code is 010, a signal applied to the delay circuit 410 may travel through the third signal path 408-3 of the second logic 404-2 (beginning with the lowest logic gate) and may experience eight logic gates of delay prior to reaching the fourth logic 404-4. And if the trimming code is 100, a signal applied to the delay circuit 410 may travel through the second signal path 408-2 of the first logic 404-1 and may experience sixteen logic gates of delay prior to reaching the fourth logic 404-4.

In some examples, the delay of different signal paths in the delay circuit may be added together. For example, if the trimming code is 011, a signal applied to the delay circuit 410 may travel through a signal path of the second logic 404-2 (beginning with the lowest logic gate), through the second connecting logic 406-2, and through a signal path of the third logic 404-3 (beginning with the second lowest logic gate). Accordingly, if the trimming code is 011, a signal applied to the delay circuit 410 may experience twelve logic gates of delay—six logic gates of delay through the second logic 404-2 plus two logic gates of delay through the second connecting logic 406-2 plus four logic gates of delay through the third logic 404-3.

Similarly, if the trimming code is 111, a signal applied to the delay circuit 410 may travel through the signal path of the first logic 404-1, through the first connecting logic 406-1, through a signal path of the second logic 404-2 (beginning with the highest lowest logic gate), through the second connecting logic 406-2, and through a signal path of the third logic 404-3 (beginning with the second lowest logic gate). Accordingly, if the trimming code is 111, a signal applied to the delay circuit 410 may experience 28 logic gates of delay—fourteen logic gates of delay through the first logic 404-1 plus two logic gates of delay through the first connecting logic 406-1 plus six logic gates of delay through the second logic 404-2 plus two logic gates of delay through the second connecting logic 406-2 plus four logic gates of delay through the third logic 404-3.

Similarly, if the trimming code is 101, a signal applied to the delay circuit 410 may travel through the signal path of the first logic 404-1, through the first connecting logic 406-1, and through a signal path of the third logic 404-3 (beginning with the highest logic gate). Accordingly, if the trimming code is 101, a signal applied to the delay circuit 410 may experience 20 logic gates of delay—fourteen logic gates of delay through the first logic 404-1 plus two logic gates of delay through the first connecting logic 406-1 plus four logic gates of delay through the third logic 404-3.

The quantity of gates in the signal paths are provided as an example, and other quantities of gates may be used in the signal paths. In some examples, additional signal paths may be included in the delay circuit 410—e.g., another signal path that includes 32 logic gates may be added.

Figure 5:
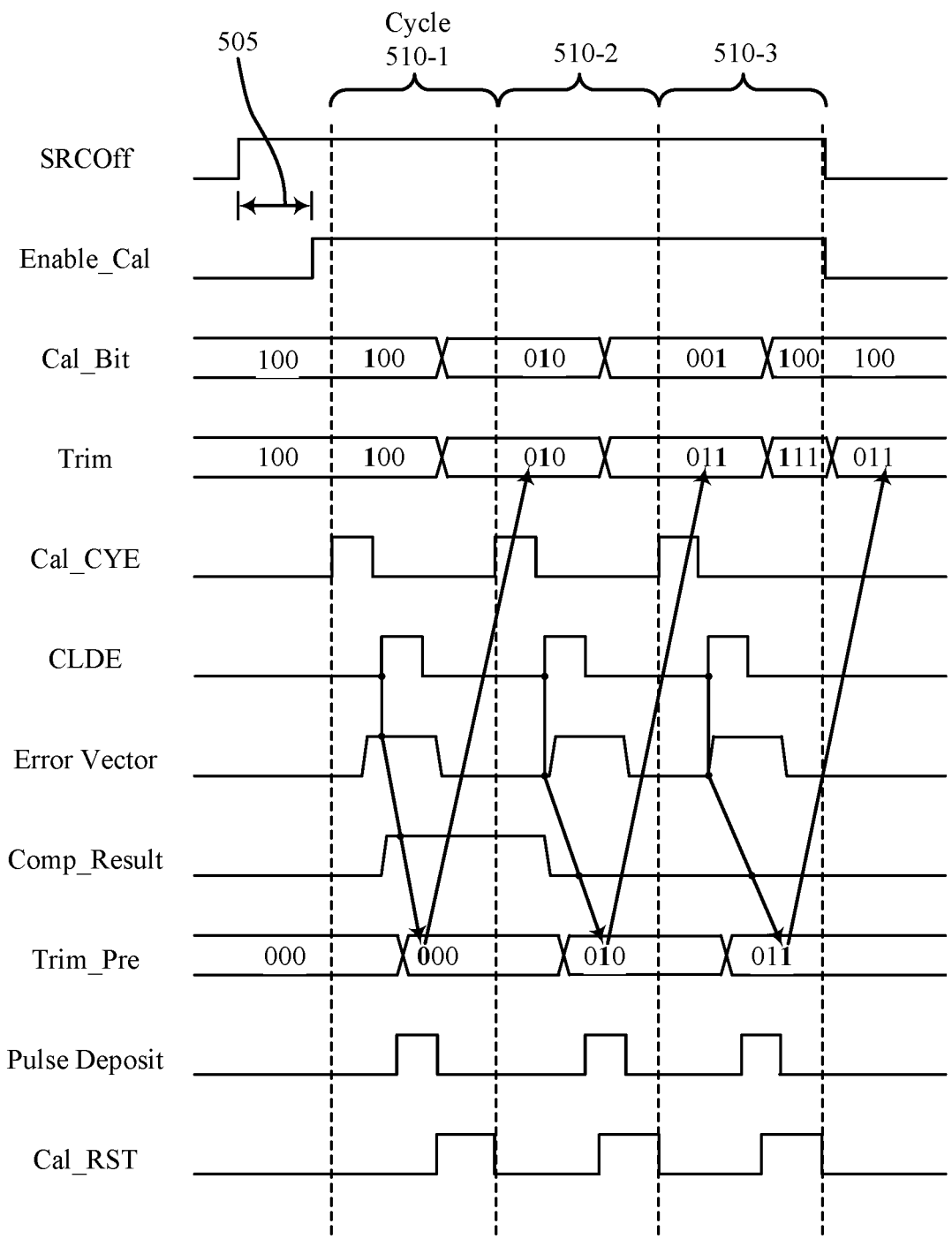
FIG. 5 shows an example of a timing diagram that supports auto-calibration of error detection signals in accordance with examples as disclosed herein.

FIG. 5 shows an example of a timing diagram that supports auto-calibration of error detection signals in accordance with examples as disclosed herein.

The timing diagram 500 depicts a state of signals while a calibration procedure for determining a trimming code that aligns a timing signal and an error vector signal is performed. The signals depicted by the timing diagram 500 may correspond to signals propagating through a subsystem described with reference to FIG. 2 or 3. The calibration procedure may depicted in timing diagram 500 may include three cycles for setting three bits of a trimming code.

After a supply is given an opportunity to stabilize during the stabilization period 505, the calibration procedure may be enabled and the first cycle 510-1 of the calibration procedure may be entered. During the first cycle 510-1, the first bit of the trimming code may be configured (as indicated by the Cal-Bit signal). In the first cycle 510-1, the timing signal (represented by CLDE) may be delayed relative to the read signal (represented by Cal_CYE) by a first amount of delay that corresponds to a trimming code of 100 (e.g., sixteen logic gates of delay)—based on the value of the Trim signal. When the CLDE signal transitions from a first voltage level (e.g., the low voltage level) to a second voltage level (the high voltage level), a timing of the CLDE signal and a timing of the Error Vector signal may be compared. That is, when the CLDE signal transitions, the voltage of the Error Vector signal may be measured to determine whether the Error Vector signal transitioned prior to the CLDE signal—e.g., if the voltage of the Error Vector signal is high, it may be determined that the Error Vector signal transitioned prior to the CLDE signal. With reference to FIG. 2 or 3, the timing comparison may be performed by applying the CLDE signal to a clocking input of a D flip-flop or latch and applying the Error Vector signal to a signal input of the D flip-flop. In some examples, the component of the Error Vector signal that transitions to a second voltage level may be known based on the known value of the erroneous codeword that is injected into the data signal. Accordingly, the proper component of the Error Vector signal may be compared with the CLDE signal.

Based on comparing the timing of the CLDE signal and the Error Vector signal, a result of the comparison (represented by Comp_Result) may be obtained. Based on the Error Vector signal transitioning prior to the CLDE signal, the Comp_Result signal may transition to the high voltage level to indicate the same. Accordingly, the calibration procedure may determine that the amount of delay associated with the first bit of the trimming code is more than necessary to align the CLDE and Error Vector signals and may set the first bit (e.g., the most significant bit) of the trimming code used for the next cycle to zero (such that the trimming code is set to 000). At the end of the first cycle 510-1, the components associated with the calibration circuit may be reset.

During the second cycle 510-2, the second bit of the trimming code may be configured (as indicated by the Cal-Bit signal). In the second cycle 510-2, the timing signal (represented by CLDE) may be delayed relative to the read signal (represented by Cal_CYE) by a first amount of delay that corresponds to a trimming code of 010 (e.g., eight logic gates of delay)—based on the value of the Trim signal (e.g., based on the Error Vector signal transitioning prior to the CLDE signal in the previous cycle, while if the Error Vector signal did not transition prior to the CLDE signal in the previous cycle, a trimming code of 110 may be used). When the CLDE signal transitions from the low voltage level to the high voltage level, a timing of the CLDE signal and a timing of the Error Vector signal may be compared. That is, when the CLDE signal transitions, the voltage of the Error Vector signal may be measured to determine whether the Error Vector signal transitioned prior to the CLDE signal—e.g., if the voltage of the Error Vector signal is low, it may be determined that the Error Vector signal transitioned after the CLDE signal. With reference to FIG. 2 or 3, the timing comparison may be performed by applying the CLDE signal to a clocking input of a D flip-flop and applying the Error Vector signal to a signal input of the D flip-flop.

Based on comparing the timing of the CLDE signal and the Error Vector signal, a result of the comparison (represented by Comp_Result) may be obtained. Based on the Error Vector signal transitioning after to the CLDE signal, the Comp_Result signal may transition to the low voltage level to indicate the same. Accordingly, the calibration procedure may determine that the amount of delay associated with the second bit of the trimming code may be less than necessary to align the CLDE and Error Vector signals and may set the second bit of the trimming code used for the next cycle to one (such that the trimming code is set to 010). At the end of the second cycle 510-2, the components associated with the calibration circuit may be reset.

During the third cycle 510-3, the third bit (e.g., the least significant bit) of the trimming code may be configured (as indicated by the Cal-Bit signal). In the third cycle 510-3, the timing signal (represented by CLDE) may be delayed relative to the read signal (represented by Cal_CYE) by a first amount of delay that corresponds to a trimming code of 011 (e.g., twelve logic gates of delay)—based on the value of the Trim signal—where the second bit of the trimming code may remain set to 1 based on the second cycle 510-2. When the CLDE signal transitions from the low voltage level to the high voltage level, a timing of the CLDE signal and a timing of the Error Vector signal may be compared. That is, when the CLDE signal transitions, the voltage of the Error Vector signal may be measured to determine whether the Error Vector signal transitioned prior to the CLDE signal—e.g., if the voltage of the Error Vector signal is low, it may be determined that the Error Vector signal transitioned after the CLDE signal. With reference to FIG. 2 or 3, the timing comparison may be performed by applying the CLDE signal to a clocking input of a D flip-flop and applying the Error Vector signal to a signal input of the D flip-flop.

Based on comparing the timing of the CLDE signal and the Error Vector signal, a result of the comparison (represented by Comp_Result) may be obtained. Based on the Error Vector signal transitioning after to the CLDE signal, the Comp_Result signal may remain at the low voltage level to indicate the same. Accordingly, the calibration procedure may determine that the amount of delay associated with the third bit of the trimming code will improve an alignment of the CLDE and Error Vector signals and may set the third bit of the trimming code used for the next cycle to one (such that the trimming code is set to 011). At the end of the third cycle 510-3, the components associated with the calibration circuit may be reset.

At the end of the third cycle 510-3, the Cal Bit signal may indicate that the first bit of the trimming code is again up for adjustment (which may cause the first bit of the trimming code to be modified). Accordingly, the calibration procedure may be terminated and the first bit of the trimming code may be reset to its preceding value (e.g., using the Trim Pre signal). The alignment achieved by the calibration procedure may be configured to accommodate large delays (e.g., a worst-case delay) in the generation of the Error Vector signal.

For different memory devices with different levels of delay associated with generating the Error Vector signal, different trimming codes may be generated. For example, for a different memory device, a trimming code of 101 may result in a preferred alignment of the CLDE and Error Vector signals. Similarly, for a single memory device, different levels of delay may be associated with generating the Error Vector signal throughout the operating life of the memory device—e.g., due to temperature changes, VDD changes, operating mode changes, clock frequency changes, etc. In such cases, different trimming codes may result in a preferred alignment of the CLDE and Error Vector signals throughout the life of the memory device. With the foregoing in mind, although FIG. 5 depicts the calibration procedure being performed at startup, the calibration procedure may be performed at different times throughout an operating life of a memory device. For example, the calibration procedure may be performed periodically to confirm that a preferred alignment of the CLDE and Error Vector signals is present. Additionally, or alternatively, the calibration procedure may be performed based on monitoring operating parameters or modes of the memory device. For example, the calibration procedure may be performed if the temperature of the memory device satisfies (e.g., exceeds) a threshold temperature, if the supply voltage satisfies (e.g., falls below) a threshold voltage, if the clock frequency for the memory device is changed, if an operating mode of the memory device is changed (e.g., to a low power mode), etc.

Although described in the context of a three bit trimming code, similar techniques may be used to configure a single bit trimming code, a two bit trimming code, a four bit trimming code, and so on.

Figure 6:
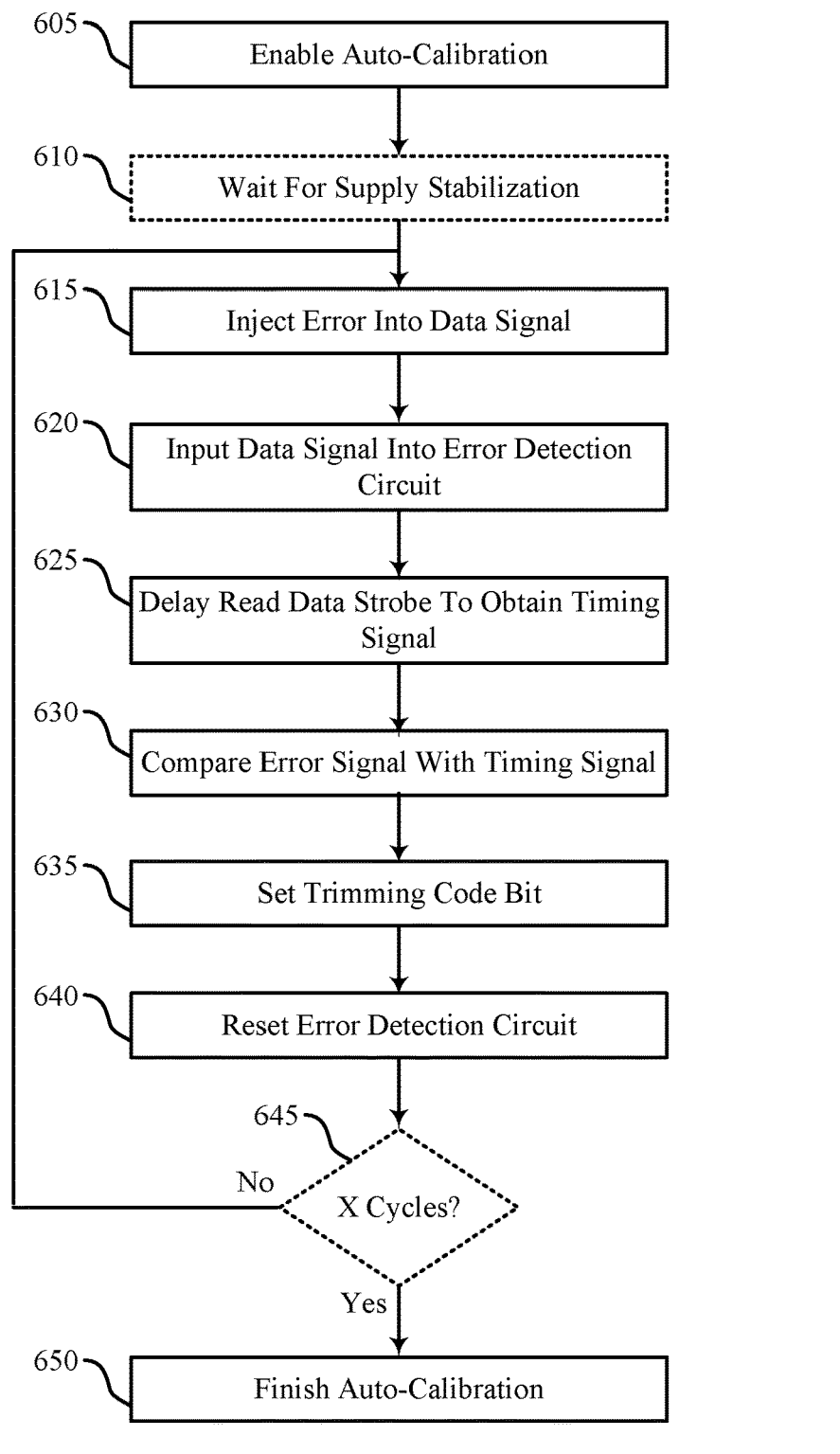
FIG. 6 shows an example of a set of operations for auto-calibration of error detection signals in accordance with examples as disclosed herein.

FIG. 6 shows an example of a set of operations for auto-calibration of error detection signals in accordance with examples as disclosed herein.

The flowchart 600 may be performed by a memory device, which may be an example of a memory device 110 described herein. In some examples, the flowchart 600 shows an example set of operations performed to support auto-calibration of error detection signals. For example, the flowchart 600 may include operations for determining a trimming code for aligning a timing and error signal by performing a calibration procedure that includes multiple cycles.

Aspects of the flowchart 600 may be implemented by a controller, among other components. Additionally, or alternatively, aspects of the flowchart 600 may be implemented as instructions stored in memory (e.g., firmware stored in a memory coupled with a controller). For example, the instructions, when executed by a controller, may cause the controller to perform the operations of the flowchart 600.

One or more of the operations described in the flowchart 600 may be performed earlier or later, omitted, replaced, supplemented, or combined with another operation. Also, additional operations described herein may replace, supplement or be combined with one or more of the operations described in the flowchart 600.

At 605, an auto-calibration mode for determining a trimming code used to set a delay of a delay circuit (e.g., the delay circuit described with reference to FIG. 2, 3, or 4) and to align a timing signal and an error signal may be enabled (e.g., by the memory device).

At 610, a duration for a power supply to stabilize may be observed (e.g., by the memory device) prior to beginning the auto-calibration procedure.

At 615, as part of the calibration procedure, an error may be injected (e.g., by the calibration circuit described with reference to FIG. 2 or 3) into a data signal read from a memory array. In some examples, the error may be injected at a known bit location of a known codeword used for the calibration procedure. In some examples, the data signal may be read from the memory array in response to a read signal (e.g., a read data strobe signal).

At 620, the data signal (including the error) may be inputted into an error detection circuit (e.g., the error detection circuit described with reference to FIG. 2 or 3), which may generate an error signal based on the received data signal. The error signal may correspond to the Error Vector signal described with reference to FIG. 5.

At 625, the read signal may be delayed (e.g., by the delay circuit) by a first amount to obtain a timing signal that controls a propagation, through the memory device, of the error signal generated by the error detection circuit. Accordingly, the timing signal may be a delayed version of the read signal. The read signal may correspond to the Cal_CYE signal and the timing signal may correspond to the CLDE signal described with reference to FIG. 5.

At 630, the error signal may be compared (e.g., by the compare logic of FIG. 3) with the timing signal—e.g., to determine a timing of the error signal relative to the timing signal.

At 635, a first bit of the trimming code may be set (e.g., by the trimming component described with reference to FIG. 3) based on the result of the comparison of the error signal and the timing signal—e.g., as described with reference to FIG. 5.

At 640, the error detection circuit may be reset so that the error vector signal is returned to a low voltage level—e.g., as depicted with reference to FIG. 5.

At 645, a determination of whether a threshold quantity of cycles (e.g., one cycle, two cycles, three cycles, etc.) have been performed by the calibration procedure may be made. If the quantity of cycles performed by the calibration procedure is less than the threshold quantity of cycles, the calibration procedure may repeat the operations described with reference to 615 through 640 in a next cycle of the calibration procedure. Otherwise, the calibration procedure may proceed to perform the operations described with reference to 650.

At 650, the auto-calibration procedure may finish. Although the auto-calibration procedure is described herein as using multiple calibration cycles to determine the trimming code, an auto-calibration procedure that uses a single pass to determine the trimming code may also be used. In such cases, the auto-calibration procedure may similarly inject an error into a data signal to obtain an error vector signal and compare the timing of the error vector signal with the timing of a timing signal that controls the propagation of the error vector signal. Based on the comparison (e.g., based on determining a duration between a rising edge of the error signal and a rising edge of the timing signal), the auto-calibration may determine a corresponding trimming code for aligning the error signal and the timing signal.

Figure 7:
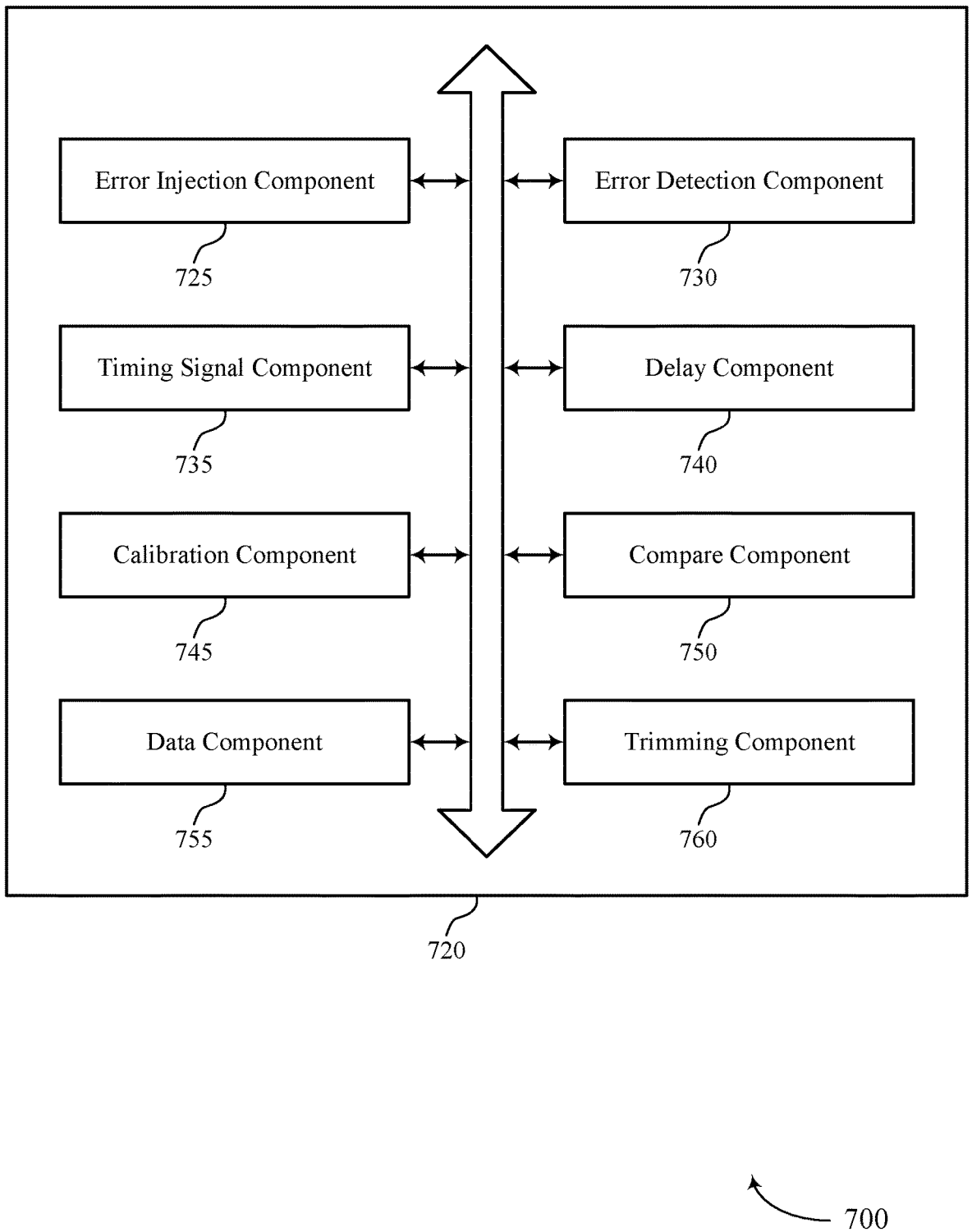
FIG. 7 shows a block diagram of a memory device that supports auto-calibration of error detection signals in accordance with examples as disclosed herein.

FIG. 7 shows a block diagram 700 of a memory device 720 that supports auto-calibration of error detection signals in accordance with examples as disclosed herein. The memory device 720 may be an example of aspects of a memory device as described with reference to FIGS. 1 through 6. The memory device 720, or various components thereof, may be an example of means for performing various aspects of auto-calibration of error detection signals as described herein. For example, the memory device 720 may include an error injection component 725, an error detection component 730, a timing signal component 735, a delay component 740, a calibration component 745, a compare component 750, a data component 755, a trimming component 760, or any combination thereof. Each of these components may communicate, directly or indirectly, with one another (e.g., via one or more buses).

The error injection component 725 may be configured as or otherwise support a means for injecting an error into a data signal obtained from a memory array. The error detection component 730 may be configured as or otherwise support a means for applying, after injecting the error into the data signal and based at least in part on a control signal, the data signal to an error detection circuit of the memory array, where the error detection circuit outputs an error signal for the data signal with a first amount of delay relative to the control signal. The timing signal component 735 may be configured as or otherwise support a means for delaying the control signal by a second amount of delay to obtain a timing signal, where the timing signal controls a propagation of the error signal relative to the data signal. The delay component 740 may be configured as or otherwise support a means for determining a third amount for delaying the control signal based at least in part on a comparison of the error signal and the timing signal.

In some examples, the data component 755 may be configured as or otherwise support a means for reading the data signal from the memory array, the data signal corresponding to a codeword stored at the memory array, where the error is injected into the data signal after the data signal is read from the memory array.

In some examples, a bit of a data portion of a codeword corresponding to the data signal is changed based at least in part on injecting the error into the data signal.

In some examples, a location of the error in a codeword corresponding to the data signal is associated with the first amount of delay for the error detection circuit, and the third amount for delaying the control signal is based at least in part on the first amount of delay determined for the error signal.

In some examples, the calibration component 745 may be configured as or otherwise support a means for initiating a calibration procedure for adjusting an amount of delay applied to the control signal, where the error is injected into the data signal based at least in part on the calibration procedure being initiated.

In some examples, during a first cycle of the calibration procedure, the control signal is delayed by the second amount of delay.

In some examples, the compare component 750 may be configured as or otherwise support a means for comparing, at a time during the first cycle of the calibration procedure, a voltage level of the error signal with a voltage level of the timing signal. In some examples, the trimming component 760 may be configured as or otherwise support a means for setting a first bit of a trimming code based at least in part on the comparing, the first bit of the trimming code being associated with the second amount of delay, where the third amount for delaying the control signal corresponds to the trimming code.

In some examples, during a second cycle of the calibration procedure, the control signal is delayed by a fourth amount of delay, and the compare component 750 may be configured as or otherwise support a means for comparing, at a second time during the second cycle of the calibration procedure, a second voltage level of the error signal with a second voltage level of the timing signal. In some examples, during a second cycle of the calibration procedure, the control signal is delayed by a fourth amount of delay, and the trimming component 760 may be configured as or otherwise support a means for setting a second bit of a trimming code based at least in part on the comparing, the second bit of the trimming code being associated with the fourth amount of delay, where the third amount for delaying the control signal corresponds to the trimming code.

The calibration component 745 may be configured as or otherwise support a means for initiating a calibration procedure for a timing signal that is for controlling a propagation of an error signal in a memory array, the error signal generated by an error detection circuit of the memory array, and the calibration procedure including a plurality of cycles. In some examples, the delay component 740 may be configured as or otherwise support a means for delaying, in each cycle of the plurality of cycles, the timing signal by a respective amount. The compare component 750 may be configured as or otherwise support a means for comparing, in each cycle of the plurality of cycles, the timing signal with the error signal generated by the error detection circuit in a respective cycle of the plurality of cycles, the timing signal being delayed by the respective amount in the respective cycle. In some examples, the compare component 750 may be configured as or otherwise support a means for determining, in each cycle of the plurality of cycles, a value for a respective bit of a trimming code based at least in part on a result of comparing the timing signal with the error signal in the respective cycle of the plurality of cycles. In some examples, the delay component 740 may be configured as or otherwise support a means for delaying the timing signal by an amount corresponding to the trimming code obtained from the determining.

In some examples, the compare component 750 may be configured as or otherwise support a means for comparing, during an initial cycle of the plurality of cycles, a voltage level of the error signal with a voltage level of the timing signal. In some examples, the trimming component 760 may be configured as or otherwise support a means for configuring, during the initial cycle, a first bit of the trimming code based at least in part on a result of comparing the voltage level of the error signal with the voltage level of the timing signal.

In some examples, the compare component 750 may be configured as or otherwise support a means for comparing, during a second cycle of the plurality of cycles, a second voltage level of the error signal with a second voltage level of the timing signal. In some examples, the trimming component 760 may be configured as or otherwise support a means for configuring, during the second cycle, a second bit of the trimming code based at least in part on a result of comparing the second voltage level of the error signal with the second voltage level of the timing signal.

In some examples, the respective amount of delay of the timing signal for the second cycle is based at least in part on the first bit of the trimming code.

In some examples, the compare component 750 may be configured as or otherwise support a means for comparing, during a third cycle of the plurality of cycles, a third voltage level of the error signal with a third voltage level of the timing signal. In some examples, the trimming component 760 may be configured as or otherwise support a means for configuring, during the third cycle, a third bit of the trimming code based at least in part on a result of comparing the third voltage level of the error signal with the third voltage level of the timing signal.

In some examples, the calibration component 745 may be configured as or otherwise support a means for terminating the calibration procedure based at least in part on determining a respective value for each bit of the trimming code.

Figure 8:
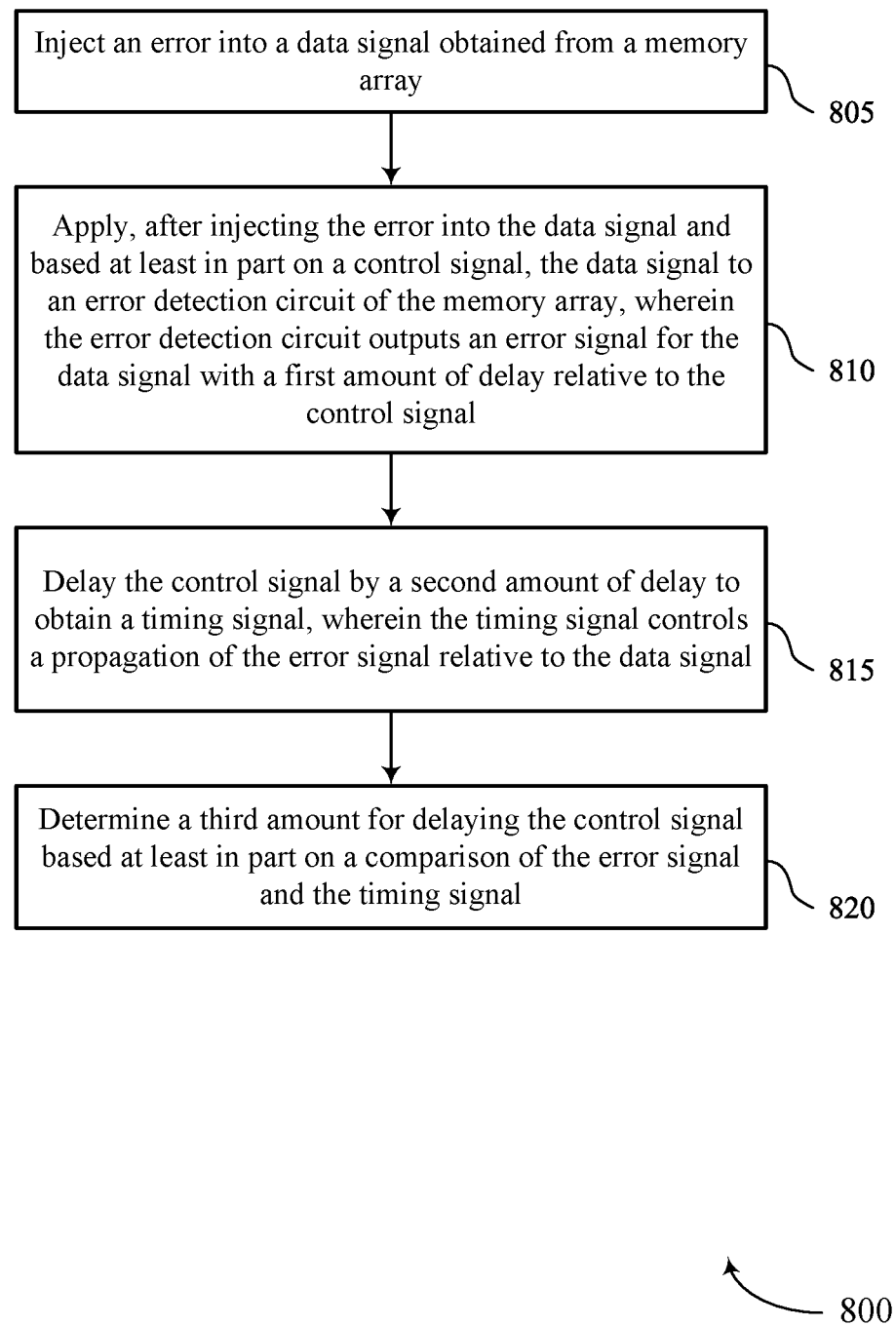
FIGS. 8 and 9 show flowcharts illustrating a method or methods that support auto-calibration of error detection signals in accordance with examples as disclosed herein.

FIG. 8 shows a flowchart illustrating a method 800 that supports auto-calibration of error detection signals in accordance with examples as disclosed herein. The operations of method 800 may be implemented by a memory device or its components as described herein. For example, the operations of method 800 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 805, the method may include injecting an error into a data signal obtained from a memory array. The operations of 805 may be performed in accordance with examples as disclosed herein. In some examples, aspects of the operations of 805 may be performed by an error injection component 725 as described with reference to FIG. 7.

At 810, the method may include applying, after injecting the error into the data signal and based at least in part on a control signal, the data signal to an error detection circuit of the memory array, where the error detection circuit outputs an error signal for the data signal with a first amount of delay relative to the control signal. The operations of 810 may be performed in accordance with examples as disclosed herein. In some examples, aspects of the operations of 810 may be performed by an error detection component 730 as described with reference to FIG. 7.

At 815, the method may include delaying the control signal by a second amount of delay to obtain a timing signal, where the timing signal controls a propagation of the error signal relative to the data signal. The operations of 815 may be performed in accordance with examples as disclosed herein. In some examples, aspects of the operations of 815 may be performed by a timing signal component 735 as described with reference to FIG. 7.

At 820, the method may include determining a third amount for delaying the control signal based at least in part on a comparison of the error signal and the timing signal. The operations of 820 may be performed in accordance with examples as disclosed herein. In some examples, aspects of the operations of 820 may be performed by a delay component 740 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for injecting an error into a data signal obtained from a memory array; applying, after injecting the error into the data signal and based at least in part on a control signal, the data signal to an error detection circuit of the memory array, where the error detection circuit outputs an error signal for the data signal with a first amount of delay relative to the control signal; delaying the control signal by a second amount of delay to obtain a timing signal, where the timing signal controls a propagation of the error signal relative to the data signal; and determining a third amount for delaying the control signal based at least in part on a comparison of the error signal and the timing signal.

Aspect 2: The method, apparatus, or non-transitory computer-readable medium of aspect 1, further including operations, features, circuitry, logic, means, or instructions, or any combination thereof for reading the data signal from the memory array, the data signal corresponding to a codeword stored at the memory array, where the error is injected into the data signal after the data signal is read from the memory array.

Aspect 3: The method, apparatus, or non-transitory computer-readable medium of any of aspects 1 through 2, where a bit of a data portion of a codeword corresponding to the data signal is changed based at least in part on injecting the error into the data signal.

Aspect 4: The method, apparatus, or non-transitory computer-readable medium of any of aspects 1 through 3, where a location of the error in a codeword corresponding to the data signal is associated with the first amount of delay for the error detection circuit, and the third amount for delaying the control signal is based at least in part on the first amount of delay determined for the error signal.

Aspect 5: The method, apparatus, or non-transitory computer-readable medium of any of aspects 1 through 4, further including operations, features, circuitry, logic, means, or instructions, or any combination thereof for initiating a calibration procedure for adjusting an amount of delay applied to the control signal, where the error is injected into the data signal based at least in part on the calibration procedure being initiated.

Aspect 6: The method, apparatus, or non-transitory computer-readable medium of aspect 5, where during a first cycle of the calibration procedure, the control signal is delayed by the second amount of delay.

Aspect 7: The method, apparatus, or non-transitory computer-readable medium of aspect 6, further including operations, features, circuitry, logic, means, or instructions, or any combination thereof for comparing, at a time during the first cycle of the calibration procedure, a voltage level of the error signal with a voltage level of the timing signal and setting a first bit of a trimming code based at least in part on the comparing, the first bit of the trimming code being associated with the second amount of delay, where the third amount for delaying the control signal corresponds to the trimming code.

Aspect 8: The method, apparatus, or non-transitory computer-readable medium of any of aspects 6 through 7, where, during a second cycle of the calibration procedure, the control signal is delayed by a fourth amount of delay and the method, apparatuses, and non-transitory computer-readable medium further includes operations, features, circuitry, logic, means, or instructions, or any combination thereof for comparing, at a second time during the second cycle of the calibration procedure, a second voltage level of the error signal with a second voltage level of the timing signal and setting a second bit of a trimming code based at least in part on the comparing, the second bit of the trimming code being associated with the fourth amount of delay, where the third amount for delaying the control signal corresponds to the trimming code.

Figure 9:
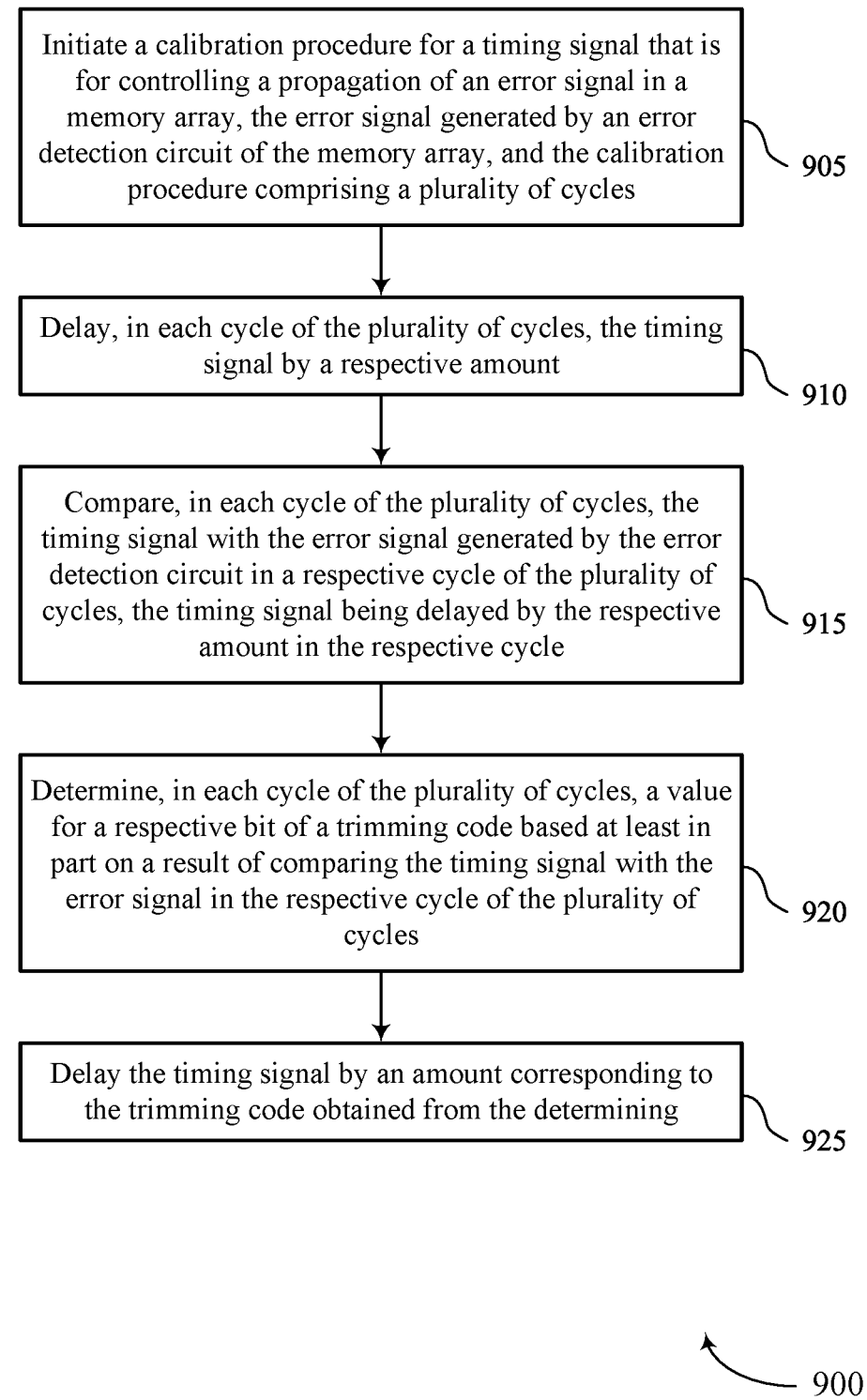

FIG. 9 shows a flowchart illustrating a method 900 that supports auto-calibration of error detection signals in accordance with examples as disclosed herein. The operations of method 900 may be implemented by a memory device or its components as described herein. For example, the operations of method 900 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 905, the method may include initiating a calibration procedure for a timing signal that is for controlling a propagation of an error signal in a memory array, the error signal generated by an error detection circuit of the memory array, and the calibration procedure including a plurality of cycles. The operations of 905 may be performed in accordance with examples as disclosed herein. In some examples, aspects of the operations of 905 may be performed by a calibration component 745 as described with reference to FIG. 7.

At 910, the method may include delaying, in each cycle of the plurality of cycles, the timing signal by a respective amount. The operations of 910 may be performed in accordance with examples as disclosed herein. In some examples, aspects of the operations of 910 may be performed by a delay component 740 as described with reference to FIG. 7.

At 915, the method may include comparing, in each cycle of the plurality of cycles, the timing signal with the error signal generated by the error detection circuit in a respective cycle of the plurality of cycles, the timing signal being delayed by the respective amount in the respective cycle. The operations of 915 may be performed in accordance with examples as disclosed herein. In some examples, aspects of the operations of 915 may be performed by a compare component 750 as described with reference to FIG. 7.

At 920, the method may include determining, in each cycle of the plurality of cycles, a value for a respective bit of a trimming code based at least in part on a result of comparing the timing signal with the error signal in the respective cycle of the plurality of cycles. The operations of 920 may be performed in accordance with examples as disclosed herein. In some examples, aspects of the operations of 920 may be performed by a compare component 750 as described with reference to FIG. 7.

At 925, the method may include delaying the timing signal by an amount corresponding to the trimming code obtained from the determining. The operations of 925 may be performed in accordance with examples as disclosed herein. In some examples, aspects of the operations of 925 may be performed by a delay component 740 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 9: A method, apparatus, or non-transitory computer-readable medium including operations, features, circuitry, logic, means, or instructions, or any combination thereof for initiating a calibration procedure for a timing signal that is for controlling a propagation of an error signal in a memory array, the error signal generated by an error detection circuit of the memory array, and the calibration procedure including a plurality of cycles; delaying, in each cycle of the plurality of cycles, the timing signal by a respective amount; comparing, in each cycle of the plurality of cycles, the timing signal with the error signal generated by the error detection circuit in a respective cycle of the plurality of cycles, the timing signal being delayed by the respective amount in the respective cycle; determining, in each cycle of the plurality of cycles, a value for a respective bit of a trimming code based at least in part on a result of comparing the timing signal with the error signal in the respective cycle of the plurality of cycles; and delaying the timing signal by an amount corresponding to the trimming code obtained from the determining.

Aspect 10: The method, apparatus, or non-transitory computer-readable medium of aspect 9, further including operations, features, circuitry, logic, means, or instructions, or any combination thereof for comparing, during an initial cycle of the plurality of cycles, a voltage level of the error signal with a voltage level of the timing signal and configuring, during the initial cycle, a first bit of the trimming code based at least in part on a result of comparing the voltage level of the error signal with the voltage level of the timing signal.

Aspect 11: The method, apparatus, or non-transitory computer-readable medium of aspect 10, further including operations, features, circuitry, logic, means, or instructions, or any combination thereof for comparing, during a second cycle of the plurality of cycles, a second voltage level of the error signal with a second voltage level of the timing signal and configuring, during the second cycle, a second bit of the trimming code based at least in part on a result of comparing the second voltage level of the error signal with the second voltage level of the timing signal.

Aspect 12: The method, apparatus, or non-transitory computer-readable medium of aspect 11, where the respective amount of delay of the timing signal for the second cycle is based at least in part on the first bit of the trimming code.

Aspect 13: The method, apparatus, or non-transitory computer-readable medium of any of aspects 11 through 12, further including operations, features, circuitry, logic, means, or instructions, or any combination thereof for comparing, during a third cycle of the plurality of cycles, a third voltage level of the error signal with a third voltage level of the timing signal and configuring, during the third cycle, a third bit of the trimming code based at least in part on a result of comparing the third voltage level of the error signal with the third voltage level of the timing signal.

Aspect 14: The method, apparatus, or non-transitory computer-readable medium of any of aspects 9 through 13, further including operations, features, circuitry, logic, means, or instructions, or any combination thereof for terminating the calibration procedure based at least in part on determining a respective value for each bit of the trimming code.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: An apparatus, including: a memory array; a delay circuit configured to delay an input signal to obtain a timing signal; an error detection circuit configured to detect errors in a data signal received from the memory array and to output an error signal for the data signal, where the timing signal is configured to control a propagation of the error signal relative to the data signal; and a calibration circuit configured to adjust a delay of the delay circuit based at least in part on a duration for the error detection circuit to output the error signal for the data signal.

Aspect 16: The apparatus of aspect 15, where the calibration circuit is further configured to: inject an error into the data signal; and provide the data signal to the error detection circuit after the error is injected into the data signal.

Aspect 17: The apparatus of any of aspects 15 through 16, where the calibration circuit is further configured to: compare voltage levels of the timing signal and voltage levels of the error signal during cycles of a calibration procedure for adjusting the delay of the delay circuit.

Aspect 18: The apparatus of aspect 17, further including: a trimming component configured to set a value of a trimming code based at least in part on results of comparing the voltage levels of the timing signal with the voltage levels of the error signal during the cycles of the calibration procedure.

Aspect 19: The apparatus of any of aspects 15 through 18, where the delay circuit is further configured to: receive a trimming code from the calibration circuit, where the delay circuit is further configured to delay the input signal by an amount corresponding to the trimming code based at least in part on a read operation being performed on the memory array.

Aspect 20: The apparatus of any of aspects 15 through 19, where the delay circuit includes first logic associated with a first amount of delay, second logic associated with a second amount of delay, and third logic associated with a third amount of delay.

Aspect 21: The apparatus of aspect 20, where the delay circuit is further configured to: set the first amount of delay, the second amount of delay, the third amount of delay, or any combination thereof, based at least in part on a trimming code configured by the calibration circuit.

Aspect 22: The apparatus of any of aspects 15 through 21, where the calibration circuit includes: a logic circuit including a first input configured to receive the error signal outputted by the error detection circuit and a clocking input configured to receive the timing signal, where the logic circuit is configured to output a comparison of the error signal and the timing signal based at least in part on receiving the error signal and the timing signal.

Aspect 23: The apparatus of any of aspects 15 through 22, where the calibration circuit includes: a multiplexer that is configured to inject an error into the data signal based at least in part on a calibration procedure being enabled for the timing signal.

Aspect 24: The apparatus of aspect 23, where: the calibration circuit includes a latch configured to provide the error to the multiplexer based at least in part on the calibration procedure being enabled, and the multiplexer includes a first input configured to receive an output of the latch and a second input configured to receive a portion of the data signal read from the memory array.

Aspect 25: The apparatus of any of aspects 23 through 24, where the input signal is a read data strobe signal.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a memory array;
a delay circuit configured to delay an input signal to obtain a timing signal;
an error detection circuit configured to detect errors in a modified data signal received at the error detection circuit and to output an error signal for the modified data signal;
logic configured to receive and combine the error signal and the modified data signal to obtain a corrected data signal, wherein the timing signal is configured to control a propagation of the error signal to the logic relative to a propagation of the modified data signal to the logic; and
a calibration circuit configured to adjust a delay of the delay circuit based at least in part on a duration for the error detection circuit to output the error signal for the modified data signal, wherein a reception of the error signal and a reception of the modified data signal at the logic is aligned based at least in part on adjusting the delay of the delay circuit, and wherein the calibration circuit is configured to inject an error into a data signal to obtain the modified data signal.

2. The apparatus of claim 1, wherein the calibration circuit is further configured to:
provide the modified data signal to the error detection circuit after the error is injected into the data signal.

3. The apparatus of claim 1, wherein the calibration circuit is further configured to:
compare voltage levels of the timing signal and voltage levels of the error signal during cycles of a calibration procedure for adjusting the delay of the delay circuit.

4. The apparatus of claim 3, further comprising:
a trimming component configured to set a value of a trimming code based at least in part on results of comparing the voltage levels of the timing signal with the voltage levels of the error signal during the cycles of the calibration procedure.

5. The apparatus of claim 1, wherein the delay circuit is further configured to:
receive a trimming code from the calibration circuit, wherein the delay circuit is further configured to delay the input signal by an amount corresponding to the trimming code based at least in part on a read operation being performed on the memory array.

6. The apparatus of claim 1, wherein:
the delay circuit comprises first logic associated with a first amount of delay, second logic associated with a second amount of delay, and third logic associated with a third amount of delay.

7. The apparatus of claim 6, wherein the delay circuit is further configured to:
set the first amount of delay, the second amount of delay, the third amount of delay, or any combination thereof, based at least in part on a trimming code configured by the calibration circuit.

8. The apparatus of claim 1, wherein the calibration circuit comprises:
a logic circuit comprising a first input configured to receive the error signal outputted by the error detection circuit and a clocking input configured to receive the timing signal, wherein the logic circuit is configured to output a comparison of the error signal and the timing signal based at least in part on receiving the error signal and the timing signal.

9. The apparatus of claim 1, wherein the calibration circuit comprises:
a multiplexer that is configured to inject the error into the data signal based at least in part on a calibration procedure being enabled for the timing signal.

10. The apparatus of claim 9, wherein:
the calibration circuit comprises a latch configured to provide the error to the multiplexer based at least in part on the calibration procedure being enabled, and
the multiplexer comprises a first input configured to receive an output of the latch and a second input configured to receive a portion of the data signal read from the memory array.

11. The apparatus of claim 9, wherein the input signal is a read data strobe signal.

12. A method, comprising:
injecting an error into a data signal obtained from a memory array, wherein a bit of a data portion of a codeword corresponding to the data signal is changed based at least in part on injecting the error into the data signal;
applying, after injecting the error into the data signal and based at least in part on a control signal, the data signal to an error detection circuit of the memory array, wherein the error detection circuit outputs an error signal for the data signal with a first amount of delay relative to the control signal;
delaying the control signal by a second amount of delay to obtain a timing signal, wherein the timing signal controls a propagation of the error signal relative to the data signal; and
determining a third amount for delaying the control signal based at least in part on a comparison of the error signal and the timing signal.

13. The method of claim 12, further comprising:
reading the data signal from the memory array, the data signal corresponding to the codeword, wherein the codeword is stored at the memory array, and wherein the error is injected into the data signal after the data signal is read from the memory array.

14. The method of claim 12, further comprising:
initiating a calibration procedure for adjusting an amount of delay applied to the control signal, wherein the error is injected into the data signal based at least in part on the calibration procedure being initiated.

15. The method of claim 14, wherein:
during a first cycle of the calibration procedure, the control signal is delayed by the second amount of delay.

16. The method of claim 15, further comprising:
comparing, at a time during the first cycle of the calibration procedure, a voltage level of the error signal with a voltage level of the timing signal; and
setting a first bit of a trimming code based at least in part on the comparing, the first bit of the trimming code being associated with the second amount of delay, wherein the third amount for delaying the control signal corresponds to the trimming code.

17. The method of claim 15, wherein, during a second cycle of the calibration procedure, the control signal is delayed by a fourth amount of delay, and wherein the method further comprises:
comparing, at a second time during the second cycle of the calibration procedure, a second voltage level of the error signal with a second voltage level of the timing signal; and
setting a second bit of a trimming code based at least in part on the comparing, the second bit of the trimming code being associated with the fourth amount of delay, wherein the third amount for delaying the control signal corresponds to the trimming code.

18. A method, comprising:
injecting an error into a data signal obtained from a memory array;
applying, after injecting the error into the data signal and based at least in part on a control signal, the data signal to an error detection circuit of the memory array, wherein the error detection circuit outputs an error signal for the data signal with a first amount of delay relative to the control signal, and wherein a location of the error in a codeword corresponding to the data signal is associated with the first amount of delay for the error detection circuit;
delaying the control signal by a second amount of delay to obtain a timing signal, wherein the timing signal controls a propagation of the error signal relative to the data signal; and
determining a third amount for delaying the control signal based at least in part on a comparison of the error signal and the timing signal, wherein the third amount for delaying the control signal is based at least in part on the first amount of delay determined for the error signal.

19. The method of claim 18, further comprising:
reading the data signal from the memory array, the data signal corresponding to the codeword, wherein the codeword is stored at the memory array, and wherein the error is injected into the data signal after the data signal is read from the memory array.

20. A method, comprising:
initiating a calibration procedure for a timing signal that is for controlling a propagation of an error signal in a memory array, the error signal generated by an error detection circuit of the memory array, and the calibration procedure comprising a plurality of cycles;
delaying, in each cycle of the plurality of cycles, the timing signal by a respective amount;
comparing, in each cycle of the plurality of cycles, the timing signal with the error signal generated by the error detection circuit in a respective cycle of the plurality of cycles, the timing signal being delayed by the respective amount in the respective cycle;
configuring, in each respective cycle of the plurality of cycles, a respective bit of a plurality of bits of a trimming code based at least in part on a result of comparing the timing signal with the error signal in the respective cycle of the plurality of cycles; and
delaying the timing signal by an amount corresponding to a value of the trimming code obtained from the configuring, the value corresponding to the configured plurality of bits.

21. The method of claim 20, further comprising:
comparing, during an initial cycle of the plurality of cycles, a voltage level of the error signal with a voltage level of the timing signal; and
configuring, during the initial cycle, a first bit of the trimming code based at least in part on a result of comparing the voltage level of the error signal with the voltage level of the timing signal.

22. The method of claim 21, further comprising:
comparing, during a second cycle of the plurality of cycles, a second voltage level of the error signal with a second voltage level of the timing signal; and
configuring, during the second cycle, a second bit of the trimming code based at least in part on a result of comparing the second voltage level of the error signal with the second voltage level of the timing signal.

23. The method of claim 22, wherein the respective amount of delay of the timing signal for the second cycle is based at least in part on the first bit of the trimming code.

24. The method of claim 22, further comprising:
comparing, during a third cycle of the plurality of cycles, a third voltage level of the error signal with a third voltage level of the timing signal; and
configuring, during the third cycle, a third bit of the trimming code based at least in part on a result of comparing the third voltage level of the error signal with the third voltage level of the timing signal.

25. The method of claim 20, further comprising:
terminating the calibration procedure based at least in part on configuring each bit of the trimming code.

\* \* \* \* \*